United States Patent [19]

Fujiyama

[11] Patent Number: 4,908,788

[45] Date of Patent: Mar. 13, 1990

[54] SHIFT CONTROL SIGNAL GENERATION CIRCUIT FOR FLOATING-POINT ARITHMETIC OPERATION

[75] Inventor: Toshiki Fujiyama, Hyogo, Japan

[73] Assignee: Mitsubishi Denki K.K., Tokyo, Japan

[21] Appl. No.: 71,739

[22] Filed: Jul. 9, 1987

[30] Foreign Application Priority Data

Oct. 9, 1986 [JP] Japan .............................. 61-241682

[51] Int. Cl.$^4$ .............................................. G06F 7/38
[52] U.S. Cl. .................................. 364/748; 364/715.08
[58] Field of Search ............... 364/748, 752, 715, 736, 364/715.08

[56] References Cited

U.S. PATENT DOCUMENTS 3,814,925  6/1974  Spannagel ........................... 364/748
4,366,548  12/1982  Kregness et al. ................... 364/748

OTHER PUBLICATIONS

Hamacher et al, *Computer Organization*, McGraw-Hill, 1978, Arithmetic 219.

Primary Examiner—Gary V. Harkcom
Assistant Examiner—Long T. Nguyen
Attorney, Agent, or Firm—Takeuchi Patent Office

[57] ABSTRACT

A logic circuit comprises a subtracter for receiving first and second binary data and outputting a difference between the first and second data, a decoder for outputting the output of the subtracter when the first data is greater than the second data and an inversion signal of the output from the subtracter when the second data is greater than the first data, and a shifter for outputting the output of the decoder without modification when the first data is greater than the second data and a shifted value of the output from the decoder when the second data is greater than the first data.

6 Claims, 3 Drawing Sheets

FIG. 3 PRIOR ART

| | SUBTRACTION RESULT IS POSITIVE | | | | SUBTRACTION RESULT IS NEGATIVE | | | |
|---|---|---|---|---|---|---|---|---|
| SUBTRACTION(a-b) | 00 | 01 | 10 | 11 | 00 | 01 | 10 | 11 |
| CARRY SIGNAL c | 0 | 0 | 0 | 0 | 1 | 1 | 1 | 1 |
| DECODER INPUT d | 00 | 01 | 10 | 11 | 00 | 11 | 10 | 01 |
| DECODER OUTPUT g | 0001 | 0010 | 0100 | 1000 | 0001 | 1000 | 0100 | 0010 |
| SHIFT QUANTITY | 0 | 1 | 2 | 3 | 0 | 3 | 2 | 1 |

FIG. 4

| | SUBTRACTION RESULT IS POSITIVE | | | | SUBTRACTION RESULT IS NEGATIVE | | | |
|---|---|---|---|---|---|---|---|---|
| SUBTRACTION(a-b) | 00 | 01 | 10 | 11 | 00 | 01 | 10 | 11 |
| CARRY SIGNAL c | 0 | 0 | 0 | 0 | 1 | 1 | 1 | 1 |
| DECODER INPUT j1, j2 | 00 | 01 | 10 | 11 | 11 | 10 | 01 | 00 |
| DECODER OUTPUT k1 TO k4 | 0001 | 0010 | 0100 | 1000 | 1000 | 0100 | 0010 | 0001 |
| SHIFTER OUTPUT g1 TO g4 | 0001 | 0010 | 0100 | 1000 | 0001 | 1000 | 0100 | 0010 |
| SHIFT QUANTITY | 0 | 1 | 2 | 3 | 0 | 3 | 2 | 1 |

SHIFT CONTROL SIGNAL GENERATION CIRCUIT FOR FLOATING-POINT ARITHMETIC OPERATION

BACKGROUND OF THE INVENTION

1. Field of the Invention

The present invention relates generally to logic circuits for shifting a floating point, particularly to a logic circuit for generating a shift control signal making use of the absolute value of a difference between exponents for shifting the mantissa in floating-point addition or subtraction.

2. Description of the Prior Art

V. Carl Hamacher et al describe in "Computer Organization," McGraw-Hill, 1978, p. 219, a floating-point arithmetic circuit such as shown in FIG. 5. It has a shift control signal generator 1 for generating a shift control signal making use of the difference between exponents. When fed with the Exponent data a and b (binary numbers) of floating-point data, a subtracter 2 outputs the absolute value d of a difference a−b and a carry signal c. When fed with the mantissa data e and f, a selector 3 feeds a right shifter 4 with the mantissa e or f of the Exponent data a or b whichever smaller in response to the carry signal c and an adder subtracter 5 with the mantissa of the larger exponent. The right shifter 4 receives the mantissa data e or f selected by the selctor 3 and controls the amount of shift in response to the absolute value d. The adder subtracter 5 receives the output from the shifter 4 and the mantissa data e or f selected by the selector 3 and performs an arithmetic operation for these data.

In FIG. 6, a decoder 6 receives the absolute value d of a difference (a−b) and generates a control signal for shifting the mantissa. The same or equivalent parts are given the same reference numerals as those of FIG. 5.

A floating-point addition or subtraction of two data is generally made with their exponents aligned to the larger one so that it is necessary to make a difference of the two exponents to shift the mantissa with the smaller exponent until the location of its radix point matches that of the larger one. This operation is generally called "shifting." In order to provide a control signal for this shift, it is necessary to obtain the absolute value of a difference of the exponents.

In FIG. 5, exponent data a and b are fed to the subtracter 2 where the data b is subtracted from the data a. If the value of data a is larger than that of the data b, the carry signal c is at a low logic level "L" while when the value of the data b is larger than that of the data a, the carry signal c is at a high logic level "H". In other words, when the carry signal c is at "L", the subtraction result is positive while when the carry signal c is at "H", the result is negative. Although it is not shown in FIG. 5, there is a circuit for performing a twos complement operation when the result is negative thereby to output the absolute value d even if the carry signal c is at "H". The twos complement operation is to invert data and add unity thereto. When the result is positive, the absolute value d is output as it is. This absolute value d is fed to the right shifter 4 for shifting the mantissa by that much.

When the carry signal c is at "H", the mantissa data e is fed to the shifter 4 while when the carry signal c is at "L", the matissa data f is fed to the shifter 4. The shifter 4 performs a shifting operation according to the amount of shift indicated by the absolute value d. Upon completion of the shifting operation, the data are fed to the adder subtracter 5 for processing.

When the shift quantity expressed in binary notation is used as a control signal as it is, it is necessary to make several shifts; i.e., bit 1 shift if the lowest order bit 1 is "1", bit 2 shift if the next bit 2 is "1", bit 4 shift if the next bit 4 is "1", and bit 8 shift if the next bit 8 is "1". For this reason, there is a barrel shifter for decoding the shift quantity to provide a control signal having only one "1" for shifting a given number of bits.

FIG. 6 shows a shift control signal generation circuit for this purpose. The absolute value d of a difference of exponents (a−b) is fed to the decoder 6 to provide a shift control signal g, which is fed to a barrel shifter for effecting shift.

The conventional floating-point adder subtracter thus constructed must take twos complements to provide the absolute value when the subtraction result of exponents is negative. Consequently, an addtional process is required for inverting data and adding unity. In other words, an addition must be made to the subtraction result, causing a delay in carry propagation and the recognition of a shift control signal.

SUMMARY OF THE INVENTION

It is a primary object of the invention to provide a high-speed shift control signal generation circuit requiring no addition process to output an absolute value.

According to the invention there is provided a logic circuit comprises a subtracter for receiving first and second binary data and outputting a difference between the first and second data, a decoder for outputting the output of the subtracter when the first data is greater than the second data and an inversion signal of the output from the subtracter when the second data is greater than the first data, and a shifter for outputting the output of the decoder without modification when the first data is greater than the second data and a shifted value of the output from the decoder when the second data is greater than the first data.

Other objects, features, and advantages of the invention will be more apparent from the following description when taken in conjunction with the accompanying drawings.

BRIEF DESCRIPTION OF THE DRAWINGS

FIG. 3 is a table showing 2-digit, twos complements on exponent data according to the prior art.

FIG. 4 is a table showing 2-digit, twos complements on exponent data according to the invention.

DESCRIPTION OF THE PREFERRED EMBODIMENTS

Figure 1:
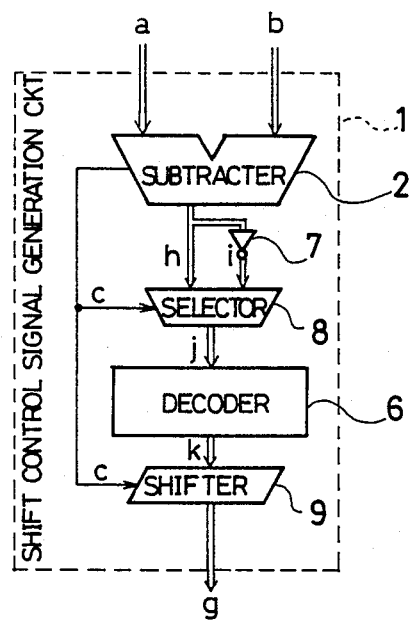
FIG. 1 shows a shift control signal generation circuit embodying the present invention.

Referring now to FIG. 1 there is shown a shift control signal generation circuit 1 for generating a shift control signal making use of the subtraction result of exponents. A subtracter 2 receives exponent data a and b and outputs a subtraction result h and a carry signal c.

An inversion amplifier 7 inverts the value of the subtraction result h to provide an inversion signal i. A selector 8 makes a selection between the subtraction result h and the inversion signal i depending on the value of the carry signal c. A decoder 6 receives an output signal j from the selector 8. A shifter 9 receives an output signal k from the decoder 6 and is controlled by the carry signal c for shifting. The result is a shift control signal g.

Figure 2:
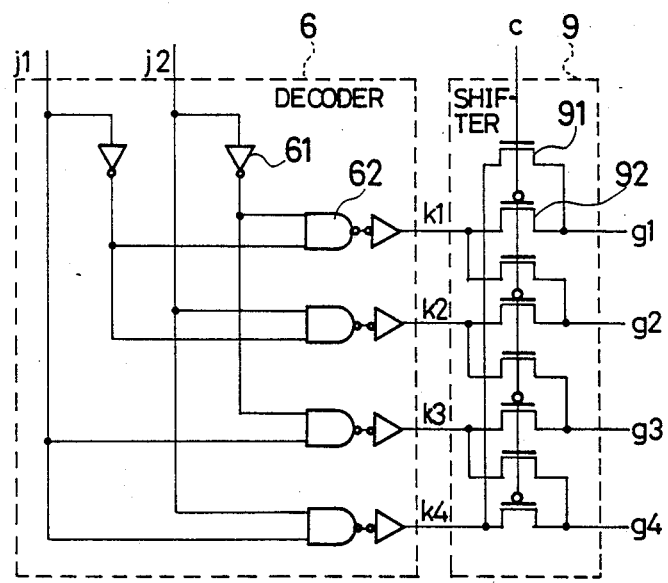
FIG. 2 is a circuit diagram of the decoder and shifter of FIG. 1.
Figure 5:
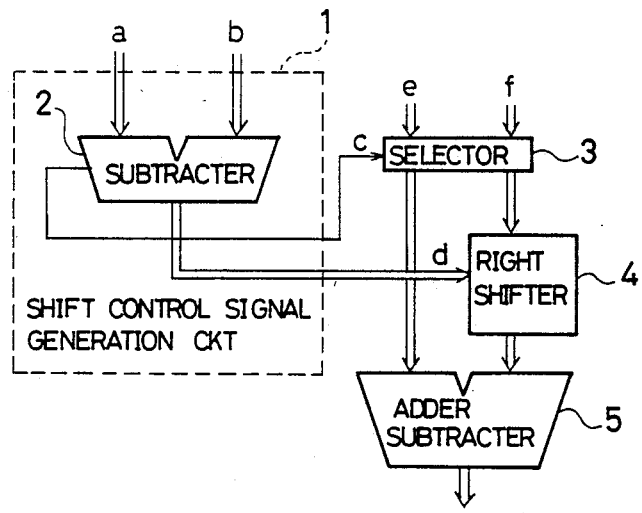
FIG. 5 shows a conventional floating-point adder subtracter circuit with a shift control signal generation circuit.
Figure 6:
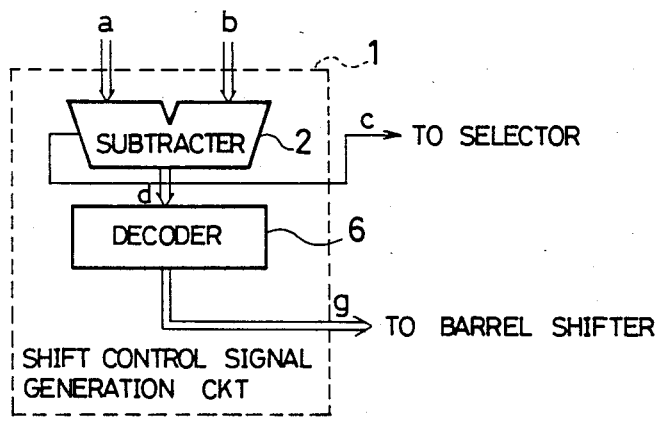
FIG. 6 illustrates another shift control signal generation circuit according to the prior art.

FIG. 2 shows the decoder and shifter useful for the above shift control signal generation circuit. The decoder 6 receives signals j1 and j2 and outputs signals k1 through k4. The shifter 9 outputs shift control signals g1 through g4. The decoder 6 has inversion amplifiers 61 and two-input NAND circuits 62. The shifter 9 has n-channel MOSFETs 91 and p-channel MOSFETs 92.

In operation, exponent data a and b are fed to the subtracter 2 where the data b is subtracted from the data a. When the value of the data a is greater than that of the data b, the carry signal c is at "L" while the value of the data b is greater than that of the data a, it is at "H". In other words, when the carry signal c is at "L", the subtraction result h is positive while the carry signal c is at "H", it is negative. The subtraction result h is inverted in the inversion amplifier 7, and the inversion data i and the subtraction result h are fed to the selector 8. When the carry signal c is at "H", the inversion signal i is fed to the decoder 6 while the carry signal c is at "L", the subtraction result h is fed to the decoder 6. The output signal k from the decoder is fed to the shifter 9. When the carry signal c is at "H", the decoder output signal k is shifted while the carry signal c is at "L", the decoder output signal k is ouput as a shift control signal g without modification.

FIGS. 3 and 4 shows exponent data in two-digit twos complement form according to the prior art and the invention, respectively. In FIG. 3, the decoder input of absolute value of the subtraction result d takes a twos complement when the subtraction result is negative. In FIG. 4, when the decoder inputs j1 and j2 are negative, the subtraction result h is the inversion of a difference (a−b). In these tables, the shift quantity is decimal while the other quantities are binary. A comparison between Figs. 3 and 4 indicates that even if the subtraction result is negative, the same results are obtained by inverting the subtracting result and shifting after decoding as those obtained by decoding after taking the absolute value.

As has been described above, according to the invention, when the second input data to a subtracter is greater than the first input data, the subtraction result is inverted, and the inversion data is decoded and shifted thereby to eliminate the necessity for decoding the absolute value of a subtraction result, thus making a high speed process possible with less hardware.

While a preferred embodiment of the invention has been described using specific terms, such description is given for illustrative purpose only, and it is to be understood that changes and variations may be made without departing the spirit and scope of the invention defined in the following claims.

What is claimed is:

1. A shift control signal generation circuit for floating-point arithmetic operation, which comprises:
   a subtracter for receiving first and second exponent data and providing a subtraction result and a carry signal;
   an inverter connected to said subtracter for inverting said subtraction result to provide an inversion data;
   a selector responsive directly to said carry signal to select between said subtraction result and said inversion data;
   a decoder connected to said selector for decoding an output from said selector to provide a decoded data; and
   a shifter responsive directly to said carry signal to either transfer said decoded data as it is or shift said decoded data to provide a shift control signal.

2. The shift control signal generation circuit of claim 1, wherein said shift control signal represents a shift quantity.

3. The shift control signal generation circuit of claim 1, wherein said carry signal is at a low logic level when a value of said first exponent data is equal to or greater than a value of said second exponent data and at a high logic level when a value of said first exponent data is less than a value of said second exponent data.

4. The shift control signal generation circuit of claim 3, wherein when said carry signal is at said low logic level, an inversion data of said subtraction result is fed to said decoder and when said carry signal is at said low logic level, said subtraction result is fed to said decoder.

5. The shift control signal generation circuit of claim 3 wherein when said carry signal is at said low logic level, said decoded data is output as it is and when said carry signal is at said high logic level, said decoded data is shifted to provide a shift control signal.

6. A shift control signal generation circuit for floating-point arithmetic operation, which comprises:
   a subtracter for receiving first and second exponent data and outputting a subtraction result between said first and second exponent data and a carry signal having a low logic level when said subtraction result is positive and a high logic level when said subtraction result is negative;
   an inverter connected to said subtracter for inverting said subtraction result to provide an inversion data;
   a selector responsive directly to said carry signal for outputting said subtraction result when said carry signal is at said low logic level and an inversion data of said subtraction result when said carry signal is at said high logic level;
   a decoder connected to said selector for decoding an output from said selector to provide a decoded data; and
   a shifter directly responsive to said carry signal for either outputting said decoded data as it is when said carry signal is at said low logic level or shifting said decoded data to provide a shift control signal when said carry signal is at said high logic level.

* * * * *